US010795698B2

(12) United States Patent
Narayanaswamy et al.

(10) Patent No.: US 10,795,698 B2
(45) Date of Patent: Oct. 6, 2020

(54) USER INTERFACE BASED ON METADATA

(71) Applicant: Microsoft Technology Licensing, LLC, Redmond, WA (US)

(72) Inventors: Rajapadmanaban Narayanaswamy, Snohomish, WA (US); James F. Ragan, Redmond, WA (US); Winston John I. Leong, Everett, WA (US); Ronald P. Klemz, Redmond, WA (US); James Dustin Gagnon, Fall City, WA (US); Jason C. Paape, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 66 days.

(21) Appl. No.: 16/044,426

(22) Filed: Jul. 24, 2018

(65) Prior Publication Data
US 2020/0034159 A1    Jan. 30, 2020

(51) Int. Cl.
*G06F 9/54* (2006.01)
*G06F 9/451* (2018.01)
*G06F 9/445* (2018.01)

(52) U.S. Cl.
CPC .......... *G06F 9/451* (2018.02); *G06F 9/44505* (2013.01); *G06F 9/44521* (2013.01)

(58) Field of Classification Search
CPC ........ G06F 3/0481; G06F 8/20; G06F 9/4443; G06F 9/541; G06F 9/547
USPC .......... 719/311, 328; 717/100; 715/700, 762
See application file for complete search history.

(56) References Cited

U.S. PATENT DOCUMENTS

| 7,349,890 | B1 | 3/2008 | Pathak et al. | |
|---|---|---|---|---|
| 8,095,565 | B2 | 1/2012 | Dengler et al. | |
| 9,729,606 | B2 | 8/2017 | Wagner | |
| 9,753,747 | B2 | 9/2017 | Offenhartz et al. | |
| 9,996,230 | B2 * | 6/2018 | Argutin ................ | G06F 3/0484 |
| 2014/0096014 | A1 * | 4/2014 | Johnson ................ | H04L 41/22 |
| | | | | 715/733 |
| 2019/0079649 | A1 * | 3/2019 | Hrastnik ............... | G06F 3/0484 |

OTHER PUBLICATIONS

"Lantern Dynamic Metadata", In Whitepaper of Modemetric, Retrieved on: May 22, 2018, 13 Pages.
Albhbah, et al., "A Rule Framework for Automatic Generation of Web Forms", In International Journal of Computer Theory and Engineering, vol. 4, No. 4, Aug. 2012, pp. 584-589.
(Continued)

*Primary Examiner* — Andy Ho
(74) *Attorney, Agent, or Firm* — Newport IP, LLC; Scott Y. Shigeta

(57) ABSTRACT

Techniques for providing a user interface (UI) are provided. The UI may include UI features that are generated using metadata. The UI features may include fields for receiving text, field labels, layout details for fields in the UI, or placeholder text for the fields. The metadata may be associated with an application service provided by a server device. A computing device may receive the metadata once the application service is invoked. The metadata may be modified at the server device. Therefore, UI features may be modified, added, or removed without requiring code changes at the computing device or server device.

20 Claims, 8 Drawing Sheets

(56) References Cited

OTHER PUBLICATIONS

Albhbah, et al., "An extended rule framework for web forms: adding to metadata with custom rules to control appearance", In International Journal of Machine Learning and Computing, vol. 1, No. 5, Dec. 2011, pp. 466-472.
Ganov, et al., "Dynamic User Interface Generation: Extended Abstract", In Proceedings of SIGCHI Conference on Human Factors in Computing Systems, Apr. 5, 2008, pp. 1-6.
Mukhedkar, Rahul, "Towards Metadata Driven User Interfaces", In Thesis of Ohio State University, Jan. 2010, 66 Pages.

* cited by examiner

USER INTERFACE BASED ON METADATA

BACKGROUND

Application services allow software to be hosted on a server and accessed and run on a client computing device. For example, application services may include software that can retrieved from a server and run in a web browser or other applications associated with a client computing device. In some implementations, application services may be maintained and updated at a single location (e.g., a server), thereby eliminated the need to make software updates across multiple client computing devices.

Traditional user interfaces (UIs) associated with application services are static in the sense that they can only be changed by developers who have access to source code or files associated with the application services. In some cases, different entities (e.g., different business entities or clients) may desire unique UIs including UI navigation, groupings of procedures or processes, and the like. For example, different entities may require a UI that implements unique UI elements, such as fields, buttons, tables, menus, forms, and so on.

In order to provide a unique UI, a programmer or developer may need to modify the code associated with an application service to provide the unique UI. For example, many entities want different procedures grouped together, a different order in which procedures are performed, different navigation or flow through a UI, or other functional changes to the UI. Implementing functional and navigational UI changes can be particularly expensive, leading to greater hosting and programming costs. Thus, when costs are prohibitive, entities may have to adapt to UI functionality that a developer has determined will best meet the needs of most entities or clients.

In accordance with the foregoing, there is a technical need to provide UI functionality that is adaptable without costly code modifications of the associated application services providing the UI functionality.

SUMMARY

The technologies described herein address the technical need to provide application services that provide unique user interface (UI) functionality without the need to make costly and extensive code modifications to the application services. To address at least this technical need, technologies described herein provide application services that provide UI functionality based on metadata. The metadata may be stored in a server device and linked to application services.

In some implementations, the UI may include UI features that are generated using metadata. The UI features may include fields for receiving text, field labels, layout details for fields in the UI, or placeholder text for the fields. The metadata may be associated with an application service provided by a server device. A computing device may receive the metadata once the application service is invoked. The metadata may be modified at the server device. Therefore, UI features may be modified, added, or removed without requiring code changes at the computing device and/or the server device.

In some implementations, the metadata usable to generate UI features may include at least one application programming interface (API) call. A computing device may render on a display device one or more of the UI features defined by the metadata. The one or more UI features may be associated with a UI.

The computing device may detect user interaction with one or more of the UI features. Upon detection of the user interaction, the metadata may invoke the API call to a server device. In response to the API call, the computing device may receive additional metadata that defines additional UI features. In response to receiving the additional metadata that defines the additional UI features, the computing device may cause the UI to concurrently display at least one or more of the additional UI features in conjunction with the one or more UI features already displayed by the UI. In some implementations, the UI, such as a UI associated with a Web browser, must not reload or refresh to display the one or more of the additional UI features concurrently with the one or more UI features already displayed by the UI.

In some implementations, a computer implemented method is provided. The method may include calling, by a computing device via an application to cause display of a UI, an application service associated with a server device, the application service including metadata that defines one or more UI features to be displayed by the UI, and receiving, at the computing device, the metadata that defines the one or more UI features to be displayed by the UI, the metadata further including a reference to an API call. Furthermore, the method may cause, by the computing device, the application to render, on a display associated with the computing device, the UI that includes the one or more UI features defined by the metadata. The method may also include detecting user interaction with the one or more UI features included in the UI, and in response to detecting the user interaction with the one or more UI features, causing, by the computing device, the application to initiate the API call referenced in the metadata. Furthermore, the method may include receiving, by the computing device, additional metadata in response to the API call, the additional metadata defining at least one additional UI feature, the additional metadata received from the server device, and adding, by the computing device, the at least one additional UI feature to the UI that includes the one or more UI features defined by the metadata, wherein the at least one additional UI feature is displayed concurrently in the UI with the one or more UI features.

In some implementations, a computer implemented method is provided. The method may include calling, by a computing device via an application to cause display of a UI, an application service associated with a server device, the application service including one or more rules that include metadata that defines one or more UI features to be displayed by the UI. Furthermore, the method may include receiving, at the computing device implementing the application to cause display of the UI, the metadata that defines the one or more UI features to be displayed by the UI, the metadata further including a reference to an API call. The computing device may cause the application to render on a display associated with the computing device the UI that includes the one or more UI features defined by the metadata received by the computing device. Additionally, the method may include detecting user interaction with the one or more UI features included in the UI, and in response to detecting the user interaction with the one or more UI features, causing, by the computing device, the application to initiate the API call referenced in the metadata.

Furthermore, in some implementations, a computer implemented method is provided that calls, by a computing device via an application to cause display of a UI, an application service associated with a server device, the application service including one or more rules that include metadata that defines one or more UI features to be displayed by the UI. The method may further include receiving, at the computing device implementing the application to cause display of the UI, the metadata that defines the one or more UI features to be displayed by the UI, and causing, by the computing device, the application to render on a display associated with the computing device the UI that includes the one or more UI features defined by the metadata received by the client computing device.

Additionally, in some implementations, a computing device may include a processor and a computer-readable storage medium in communication with the processor. The computer-readable storage medium may computer-executable instructions stored thereupon. The instructions, when executed by the processor, may cause the processor to receive metadata that defines one or more UI features to be displayed by a UI of an application associated with the computing device. Furthermore, the instructions, when executed by the processor, may cause the processor to cause the application to render on a display associated with the computing device the UI that includes the one or more UI features defined by the metadata received by the client computing device.

In some implementations, a computing device may include a processor, and a computer-readable storage medium in communication with the processor, the computer-readable storage medium having computer-executable instructions stored thereupon which, when executed by the processor, cause the processor to communicate from the computing device, such as a client computing device, to a remote computing device, such as a server device, metadata that defines one or more user interface (UI) features. Furthermore, the computer-executable instructions may cause the processor to receive notification that user interaction with the one or more UI features as occurred, and provide additional metadata defining at least one additional UI, the additional metadata provided in response to receiving the notification that the user interaction with the one or more UI features as occurred. Moreover, the computer-executable instructions may cause the processor to communicate, from the computing device to the remote computing device, the additional metadata defining the at least one additional UI feature, the additional metadata configured to add the at least one additional UI feature to a UI that includes the one or more UI features defined by the metadata, wherein the at least one additional UI feature is to be displayed concurrently in the UI with the one or more UI features.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
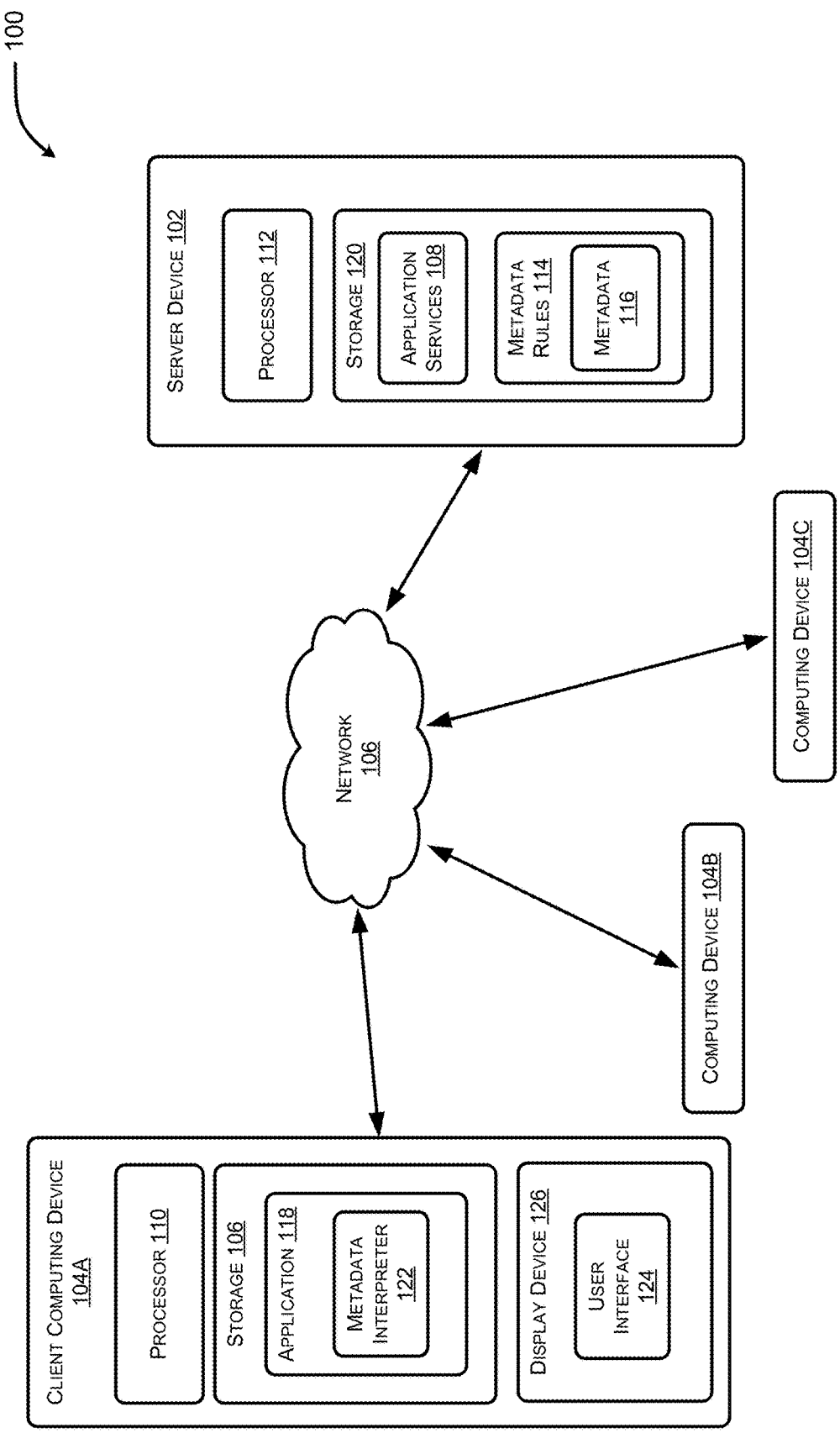
FIG. 1 is a block diagram illustrating an example computing environment that may include computing devices associated with described metadata derived user interface (UI) implementations.

The technologies described herein address the technical need to provide application services that provide unique user interface (UI) functionality without the need to make costly code modifications to the application services. In particular, to address at least this technical need, technologies described herein provide application services that provide UI functionality based on metadata. The metadata may be associated with metadata rules stored in a server device and linked to application services.

In some implementations, the UI may include UI features that are generated using metadata. The UI features may include fields for receiving text, field labels, layout details for fields in the UI, or placeholder text for the fields. The metadata may be associated with an application service provided by a server device. A computing device may receive the metadata once the application service is invoked. The metadata may be modified at the server device. Therefore, UI features may be modified, added, or removed without requiring code changes at the computing device or server device.

In some implementations, the metadata usable to generate UI features may include at least one application programming interface (API) call. A computing device may render on a display device one or more of the UI features defined by the metadata. The one or more UI features may be associated with a UI.

The computing device may detect user interaction with one or more of the UI features. Upon detection of the user interaction, the metadata may invoke the API call to a server device. In response to the API call, the computing device may receive additional metadata that defines additional UI features. In response to receiving the additional metadata that defines the additional UI features, the computing device may cause the UI to concurrently display at least one or more of the additional UI features in conjunction with the one or more UI features already displayed by the UI. In some implementations, the UI, such as a UI associated with a Web browser, must not reload or refresh to display the one or more of the additional UI features concurrently with the one or more UI features already displayed by the UI.

In some implementations, a computer implemented method is provided. The method may include calling, by a computing device via an application to cause display of a UI, an application service associated with a server device, the application service including metadata that defines one or more UI features to be displayed by the UI, and receiving, at the computing device, the metadata that defines the one or more UI features to be displayed by the UI, the metadata further including a reference to an API call. Furthermore, the method may cause, by the computing device, the application to render, on a display associated with the computing device, the UI that includes the one or more UI features defined by the metadata. The method may also include detecting user interaction with the one or more UI features included in the UI, and in response to detecting the user interaction with the one or more UI features, causing, by the computing device, the application to initiate the API call referenced in the metadata. Furthermore, the method may include receiving, by the computing device, additional metadata in response to the API call, the additional metadata defining at least one additional UI feature, the additional metadata received from the server device, and adding, by the computing device, the at least one additional UI feature to the UI that includes the one or more UI features defined by the metadata, wherein the at least one additional UI feature is displayed concurrently in the UI with the one or more UI features.

In some implementations, a computing device may include a processor, and a computer-readable storage medium in communication with the processor, the computer-readable storage medium having computer-executable instructions stored thereupon which, when executed by the processor, cause the processor to communicate from the computing device, such as a client computing device, to a remote computing device, such as a server device, metadata that defines one or more user interface (UI) features. Furthermore, the computer-executable instructions may cause the processor to detect user interaction with the one or more UI features, and in response to the user interaction with the one or more UI features, receiving a request for additional metadata defining at least one additional UI feature. Moreover, the computer-executable instructions may cause the processor to communicate, from the computing device to the remote computing device, the additional metadata defining the at least one additional UI feature, the additional metadata configured to add the at least one additional UI feature to a UI that includes the one or more UI features defined by the metadata, wherein the at least one additional UI feature is to be displayed concurrently in the UI with the one or more UI features.

Various examples, implementations, scenarios, and aspects are described below with reference to FIGS. 1 through 8.

Before describing exemplary techniques for providing UIs based on metadata provided by an application service associated with a server device, an example of a suitable use environment is described with reference to FIG. 1, which shows an example computing system 100.

FIG. 1 illustrates an example system 100 implementing a server device 102. In some implementations, the system 100 includes the server device 102 and various devices 104A-104C that can communicate with one another, as well as with the server device 102, via a network 106. The devices 104A-104C may be collectively referred to herein as the devices 104. Furthermore, a single device may be referred to herein as a device 104.

The network 106 can be a variety of different networks, including the Internet, a local area network (LAN), a wide area network (WAN), a personal area network, a cellular or other phone network, an intranet, other public and/or proprietary networks, combinations thereof, and so forth. It should be noted that network 106 can be configured to include multiple networks.

The devices 104 can be a variety of different types of devices. For example, in the system 100 each of the devices 104 may be one of a laptop or netbook computer device, a cellular or other wireless phone (e.g., a smartphone) device, a tablet or notepad computer, a printer, a desktop computer, a television or other display device, a cloud service (e.g., an online service storing audio/video content for playback, and/or an online gaming service), and so forth.

The devices 104 illustrated in the system 100 are examples of devices, and various other types of devices can also be included in the system 100 such as a server computer, a mobile station, an entertainment appliance, a set-top box communicatively coupled to a display device, a game console, an automotive computer, a scanner, a facsimile machine, a wireless headset (e.g., a Bluetooth® headset), and so forth.

The server device 102 provides one or more services, such as application services (e.g., Web services), that can be accessed by a user and the client computing device (e.g., client computing device 104A) via a network (e.g., network 106 in the example of FIG. 1). The server device 102 is implemented using one or more of a variety of different types of devices, including one or more of the same types as the devices 104 and/or other types of devices (e.g., distributed or co-located server computers).

The server device 102, in particular, may be implemented as a distributed computing environment that comprises one or more storage devices (e.g., storages) and one or more processors that are co-located and/or located in disparate geographical areas. The one or more storage devices and/or the one or more processors may be coupled together by way of a network, such as the network 106.

The server device 102 may include a processor 112 and a storage 120. The storage 120 may include computer executable instructions that may be executed by the processor 112. For example, the storage 120 may include one or more application services 108 (e.g., Web services). When an application service 108 is accessed by a client computing device, such as the client computing device 104A, the processor 112 may cause the application service 108 to execute. Alternatively, the application service 108, when accessed by the client computing device 104A, may be delivered to the client computing device 104A by the server device 102. In such a scenario, a processor 110 associated with the client computing device 104A may cause the application service 108 to execute.

The storage 120 may further include one or more metadata rules 114. The one or more metadata rules 114 may have associated metadata 116. The one or more metadata rules 114 may be linked to one or more of the application services 108. For example, a first of the application services 108 may be linked to a first set of the metadata rules 114, and a second of the application services 108 may be linked to a second set of the metadata rules 114. In general, a metadata rule 114 is a collection of metadata 116 that is linked to one or more application services 108. Therefore, a metadata rule 114 may be generally considered metadata.

The metadata rules 114 and associated metadata 116 may include information usable by the client computing device 104 to generate one or more UI features for display in a UI 124. For example, the UI 124 may be displayed on a display device 126 associated with the client computing device 104. In particular, the client computing device 104 may include an application 118 associated with a storage 106. The application 118 may be a web browser. The application 118 may be caused to execute by way of a processor 110 to generate the UI 124 (e.g., a Web browser).

Upon execution, the application 118 may make a call to one of the application services 108. Specifically, the call to one of the application services 108 may cause the processor 112 to execute the called application service 108. Execution of the application service 108 may deliver the metadata 116 to the client computing device 104A.

The application 118 may receive the metadata 116. The application 118 may use the metadata 116 to generate one or more UI features that are rendered by the UI 124 and displayed on the display 126 associated with the client computing device 104 The application 118 may include a metadata interpreter 122 that interprets the metadata 116 to generate the one or more UI features that are rendered by the UI 124 and displayed on the display 126.

In some implementations, the metadata 116 may include information that the application 118 uses to render the one or more UI features that are rendered by the UI 124 and displayed on the display 126. Specifically, the metadata 116 may include information such as the data collection "sections" to display (a "section" is a collection of fields); fields to display within a "section"; an order in which fields are to be displayed; type(s) of control to render for each field (e.g., textbox, dropdown, checkbox, etc.); labels, hints, or other "informative" details that should be displayed for each field/control; an application programming interface (API) call associated with the metadata 116; accessibility content (such as aria labels) for UI elements; layout hints that help describe where a field/control should be placed on the UI 124; placeholder text to use as a guide to inform a user of the UI 124 about what content should be provided for a field/control; relationships between fields/controls, and what actions to perform should one of the field values in a relationship change; data collection rules for each field/control (e.g., field is required/optional/read only, max length of input for field, regular expression pattern to follow when entering text); and/or existing data values if field/control was previously saved by a user of the UI 124.

There are a number of technical benefits to the described rule and metadata based techniques for generating the UI 124 and the UI features that are generated based on the metadata 116 associated with the rules 114. For example, the look and function of the UI 124 and its associated UI features may be quickly modified or changed by simply modifying the metadata 116 associated with one or more of the application services 108. Additionally, because UI features may be generated based on the metadata 116, the need to deploy exclusive code defining unique UI features on each individual client computer device 104 may be eliminated or greatly reduced. That is, rather than building unique code defining UI features that run on enterprise client computing devices, such as one or more of the client computing devices 104, a general application, such as the application 118, may be used to render UI features that are based on quickly modifiable rules and metadata, such as the metadata rules 114 and the associated metadata 116.

Figure 2:
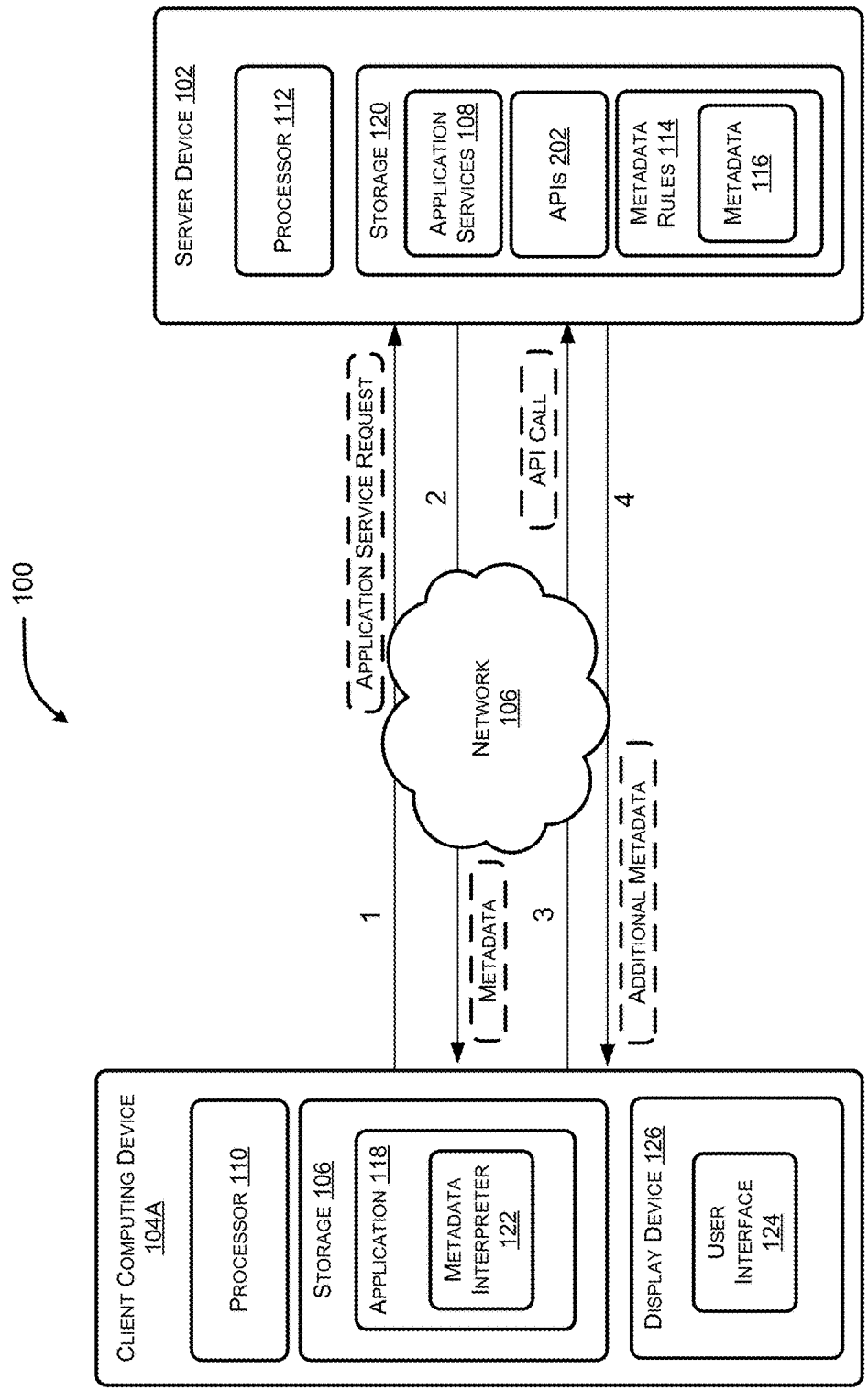
FIG. 2 is a block diagram providing additional details of an example computing environment, such as the example computing environment illustrated in FIG. 1.

FIG. 2 illustrates additional details and functionalities associated with the client computing device 104 and the server device 102. At communication 1, the client computing device 104 calls an application service, such as one of the application services 108. The client computing device 104 may use the application 118 to make the call for the application service 108. In some implementations, the application service is called using a request, such as a data message sent to the server device 102 by the client computing device 104. In some implementations, the call for the application service 108 is embedded in a universal resource locator (URL) request made by the application 118. Exemplary application services 108 include banking application services, database application services, and the like. The application services 108 may be Web application services, Web services or in general simply server provided code that is executed by the server device 102 and/or the device 104.

At communication 2, the called application service 108 provides metadata 116 to the client computing device 104 the metadata 116 is received at the client computing device 104 in particular, the metadata 116 is received by the application 118 and interpreted by the metadata interpreter 122. The metadata 116 is interpreted by the metadata interpreter 122 to generate one or more UI features that are rendered in the UI 124 and displayed on the display device 126 as part of the UI 124.

The metadata 116 may include information that is used by the metadata interpreter 122 to provide data collection "sections" to display on the display device 126 as part of the UI 124; fields to display within a "section"; an order in which fields are to be displayed; type(s) of control to render for each field (e.g., textbox, dropdown, checkbox, etc.); labels, hints, or other "informative" details that should be displayed for each field/control; an API call associated with the metadata 116; accessibility content (such as aria labels) for UI elements; layout hints that help describe where a field/control should be placed in the UI 124; placeholder text to use as a guide to inform a user of the UI 124 about what content should be provided for a field/control; relationships between fields/controls, and what actions to perform should one of the field values in a relationship change; data collection rules for each field/control (e.g., field is required/optional/read only, max length of input for field, regular expression pattern to follow when entering text); and/or existing data values if field/control was previously saved by a user of the UI 124.

The metadata 116 provided by the application service 108 at communication 2 may include an embedded API call. In some implementations, the embedded API call is to be made subsequent to a user's interaction with one or more UI features associated with the user interface 124. Those one or more UI features associated with the user interface 124 may have been rendered by the UI 124 and displayed on the display device 126 using the metadata 116 received at communication 2.

At communication 3, an API call is made to the server device 102. The API call to the server device 102 may be made upon detection of user interaction with the one or more UI features associated with the user interface 124. Detection of the user interaction may be made by the client computing device 104 and/or the server device 102. For example, the client computing device 104 may inform, communicate with or otherwise notify the server device 102 when it is determined that the user interaction with the one or more UI features has occurred. Notification of such a determination may be made by simple data messaging or the like, via the network 106.

The server device 102 may retrieve the API associated with the API call from one or more APIs 202 associated with the storage 120. In response to the API call, at communication 4, the application service 108 may return additional metadata 116 to the client computing device 104A. The additional metadata 116 is received at the client computing device 104A. In particular, the additional metadata 116 is received by the application 118 and interpreted by the metadata interpreter 122. The additional metadata 116 is interpreted by the metadata interpreter 122 to generate one or more UI features that are rendered in the UI 124 and displayed on the display device 126 as part of the UI 124.

In some implementations, the one or more UI features associated with the additional metadata 116 may be displayed concurrently with the metadata based UI features already displayed as part of the UI 124. Furthermore, in some implementations, adding the one or more UI features associated with the additional metadata 116 may not require reloading or refreshing the UI 124. Eliminating the need to refresh or reload the UI 124 when displaying the one or more UI features associated with the additional metadata 116 saves processor overhead and a significantly enhances the performance of the UI 124.

The additional metadata 116 may include information that is used by the metadata interpreter 122 to provide data collection "sections" to display on the display device 126 as part of the UI 124; fields to display within a "section"; an order in which fields are to be displayed; type(s) of control to render for each field (e.g., textbox, dropdown, checkbox, etc.); labels, hints, or other "informative" details that should be displayed for each field/control; an API call associated with the additional metadata 116; accessibility content (such as aria labels) for UI elements; layout hints that help describe where a field/control should be placed in the UI 124; placeholder text to use as a guide to inform a user of the UI 124 about what content should be provided for a field/control; relationships between fields/controls, and what actions to perform should one of the field values in a relationship change; data collection rules for each field/control (e.g., field is required/optional/read only, max length of input for field, regular expression pattern to follow when entering text); and/or existing data values if field/control was previously saved by a user of the UI 124.

Figure 3:
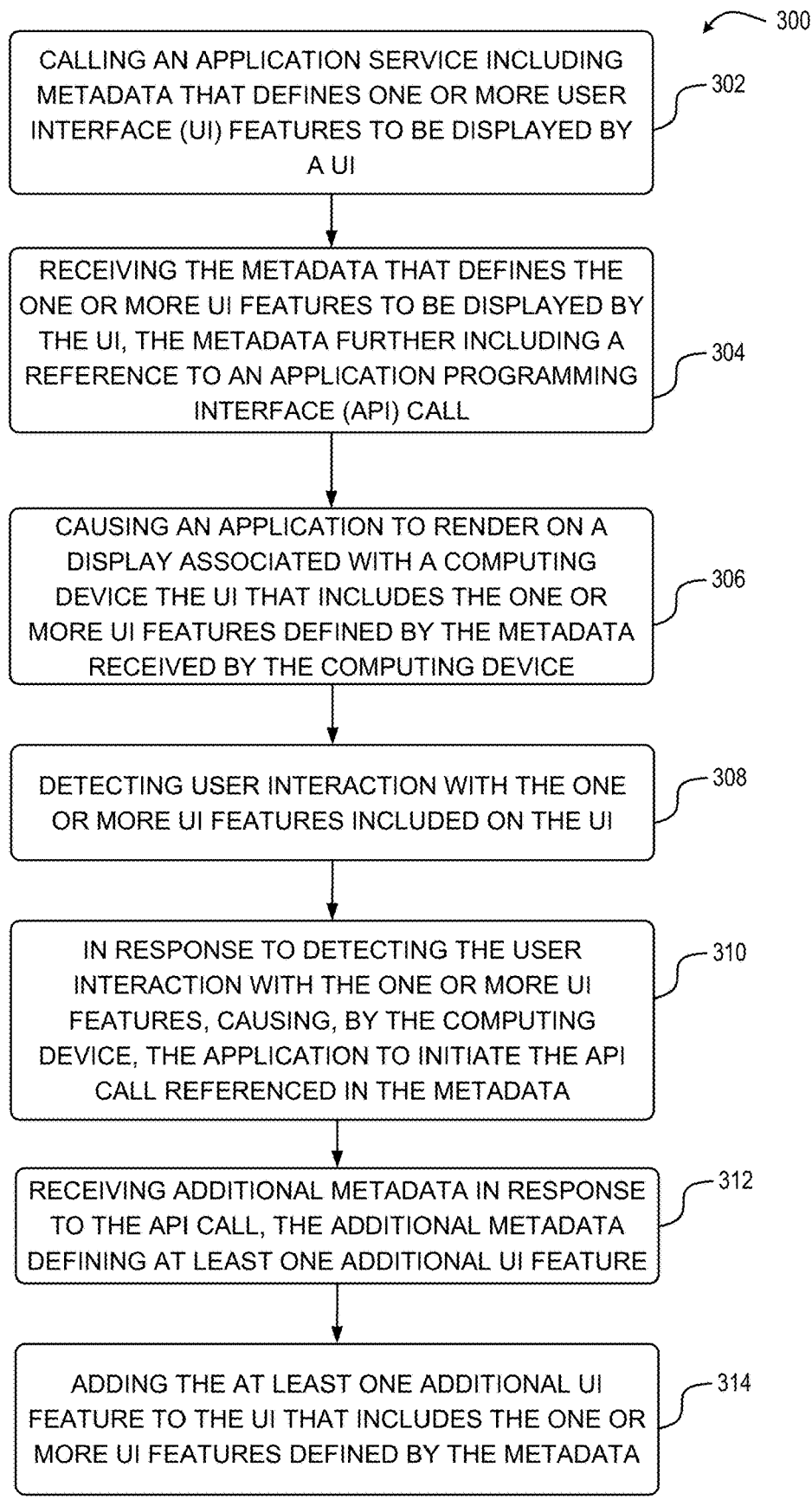
FIG. 3 illustrates a flow chart diagram relating to operations associated with the described metadata implemented UI techniques.

FIG. 3 is a diagram of an example flowchart 300 that illustrates operations associated generating UI features using metadata. In some implementations, the operations of FIG. 3 can be performed by components of one or more computing devices, such one or more of the client computing devices 104 and/or the server device 102. Therefore, the instructions associated with the example flowchart 300 may be executed by one or more processors associated with server-side components (e.g., the server device 102) and/or client-side components (one or more of the client computing devices 104).

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., the system 100, the computing device(s) 104 and/or, the server device 102) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

The flowchart 300 begins at operation 302, where an application service is called by the computing device 104. In some implementations, the server device 102 stores the application service. The application service may have metadata linked thereto. The metadata may define one or more UI features to be rendered and displayed by a UI.

At operation 304, the metadata associated with the application service is received by the computing device 104. The metadata associated with the application service may be delivered by the server device 102. The metadata, as indicated in the foregoing, may define one or more features to be rendered and displayed by the UI. In addition, in some implementations, the metadata may include an API call.

At operation 306, the computing device 104 causes an application, such as a Web browser, to render on a display associated with the computing device 104 the UI that includes one or more UI features defined by the metadata received at operation 304. The UI features may include one or more fields to receive text entered by a user of the UI, one or more drop-down fields that include selectable UI items and/or text, UI layout particulars associated with one or more fields defined by the metadata, field labels, data collection rules associated with fields defined by the metadata, and the like.

At operation 308, the computing device 104, via the application providing the UI, detects a user's interaction with the one or more UI features defined by the metadata and displayed at operation 306. For example, the computing device 104 may detect that the user has entered text into one or more of the UI features defined by the metadata.

At operation 310, in response to detecting user interaction with the one or more UI features defined in the metadata, the computing device 104, via the application providing the UI, initiates an API call that was included in the metadata received at operation 304. In some implementations, the API call is made to the server device 102. The server device 102, in response to the API call, causes the application service of operation 302 to provide additional metadata to the computing device 104.

The additional metadata may include additional one or more UI features that may be rendered by the UI and displayed on the display device associated with the client computer 104. In some implementations, the additional one or more UI features may be related to the one or more UI features defined by the metadata received at operation 304. Specifically, the additional one or more UI features may be "child" one or more UI features of the "parent" one or more UI features received at operation 304. A UI feature may be considered a child UI feature of another UI feature when the child UI feature is topically related to the other UI feature.

At operation 312, the computing device 104 receives the additional metadata in response to the API call of operation 310. In some implementations, the additional metadata is provided by the server device 102. The additional metadata may define at least one additional UI feature that may be displayed in the UI that includes one or more UI features defined by the metadata received at operation 304.

At operation 314, the computing device 104 adds at least one additional UI feature to the UI that includes the one or more UI features defined by the metadata received at operation 304. The at least one additional UI feature is defined by the additional metadata received operation 312. In some implementations, the at least one additional UI feature is concurrently displayed in the UI with the one or more UI features defined by the metadata received at the operation 304. In some implementations, the UI does not reload or refresh when the at least one additional UI feature is added to the UI. Because the UI does not reload or refresh when the at least one additional UI feature is added to the UI, processing overhead is reduced and the speed in which the UI is rendered is enhanced.

Figure 4:
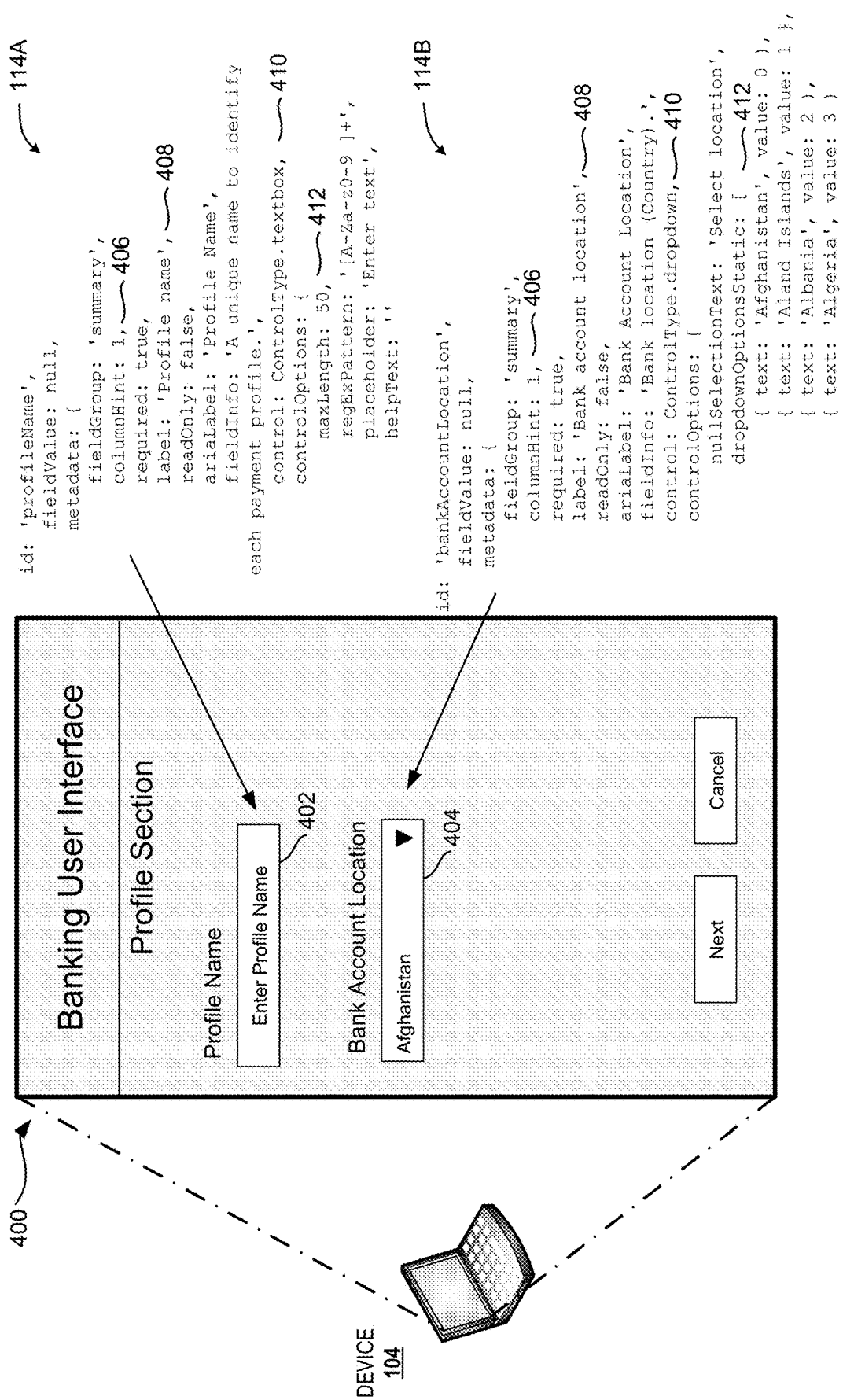
FIG. 4 illustrates an exemplary UI that may be displayed on a computing device in conjunction with the described metadata implemented UI techniques.

FIG. 4 illustrates an exemplary UI 400 that may be displayed on a display associated with the client computing device 104. In some implementations, the UI 400 is displayed in response to execution of at least some of the operations 302-310, described in conjunction with FIG. 3.

The exemplary UI 400 is a banking UI that may be generated in part using the metadata 114 (e.g., the illustrated metadata 114A and 114C). Specifically, in the example illustrated in FIG. 4, the metadata 114 is usable to generate the illustrated exemplary banking UI. However, the exemplary UI 400 illustrated in FIG. 4 may be generalized to any type of UI that is generated using metadata.

The illustrated UI 400 includes a text field 402 and a drop-down field 404. The field 402 was generated using the metadata 114A and the field 404 was generated using the metadata 114B. The metadata 114 may have been received from the server device 102, subsequent to an application service call made by the device 104.

In some implementations, the metadata 114A and 114B includes layout details 406, the field name detail 408, a control type indicator 410, field behavior rules 412, and the like. The particular format of the metadata 114, as illustrated, is exemplary.

Figure 5:
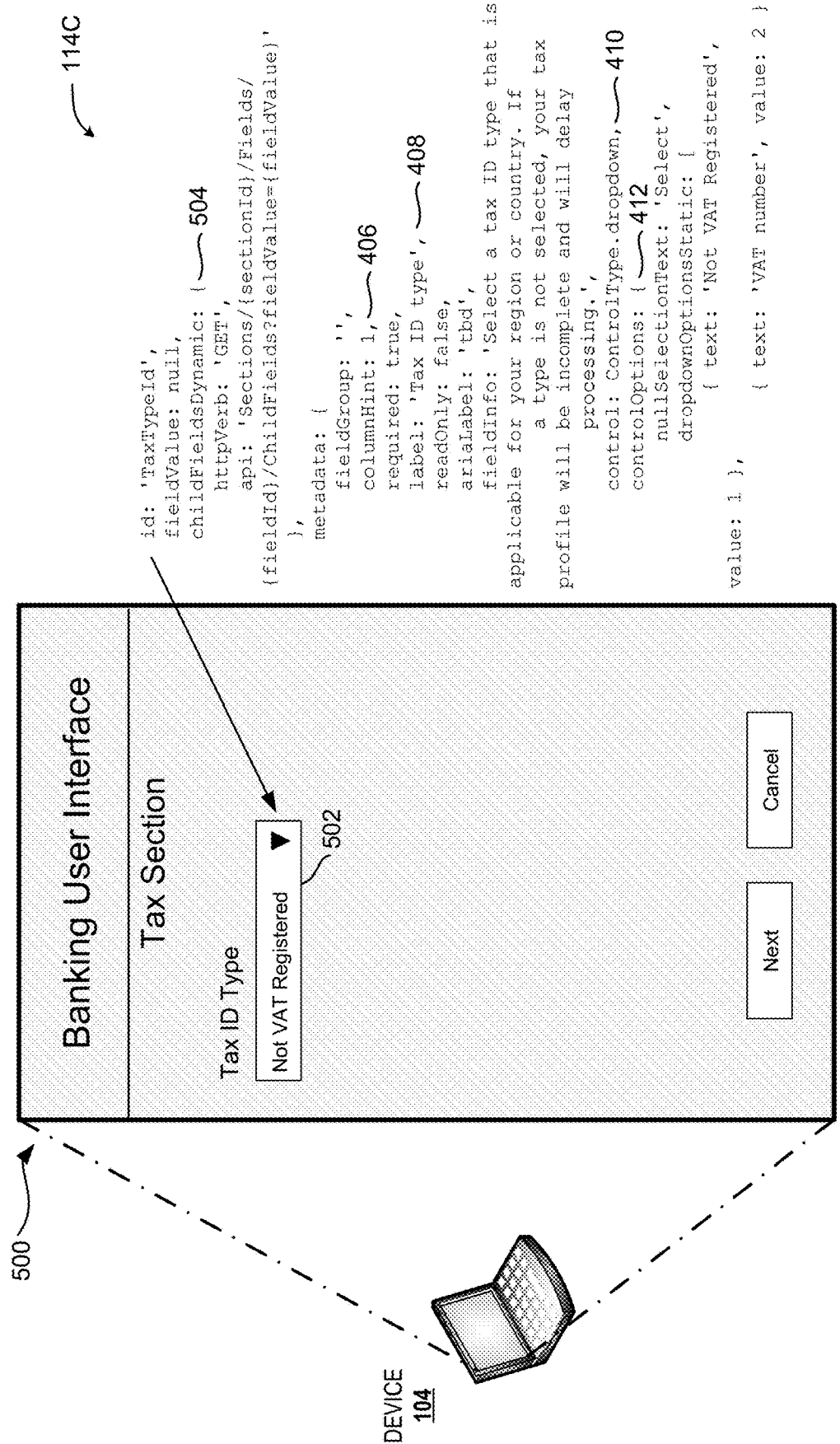
FIG. 5 illustrates an exemplary UI that may be displayed on a computing device in conjunction with the described metadata implemented UI techniques.

FIG. 5 illustrates an exemplary UI 500 that may be displayed on a display associated with the client computing device 104. In some implementations, the UI 500 is displayed in response to execution of at least some of the operations 302-310, described in conjunction with FIG. 3.

In some implementations, the UI 500 is displayed subsequent to the UI 400. For example, the UI 400 may be a first section of the banking UI and the UI 500 may be a second or subsequent section of the banking UI.

The UI 500 includes a drop-down field 502. The drop-down field 500 may have been generated using the metadata 114C. The metadata 114C may have been received from the server device 102, subsequent to an application service call made by the device 104. In some implementations, the metadata 114C includes at least layout details 406, the field name detail 408, a control type indicator 410, field behavior rules 412, and the like. The particular format of the metadata 114C, as illustrated, is exemplary.

The metadata 114C additionally includes an API call 504. In some implementations, the API call 502 is made subsequent to user interaction with the field 502. Specifically, an API called by the API call 502 is predicated on a user's interaction with the field 502. For example, user selection of "Not VAT Registered" may cause the metadata 114C and/or the application rendering the UI 500 to ignore the API call 502, where user selection of "VAT Number" may cause the metadata 114C and/or the application rendering the UI 500 to call the API call 502 (see FIG. 6).

In some implementations, a user's interaction with the field 502 will initiate the API call 502, regardless of the type of user selection associated with the field 502. In particular, in some implementations, as discussed in the following, one or more user interactions with the field 502 will trigger the API call 504, which will cause the server device 102 to deliver additional metadata to the computing device 104. However, while one or more user interactions with the field 502 will trigger the API call 504, those one or more user interactions with the field 502 will not cause the server device 102 and the API associated with the API call 504 to deliver additional metadata to the client computing device 104.

Figure 6:
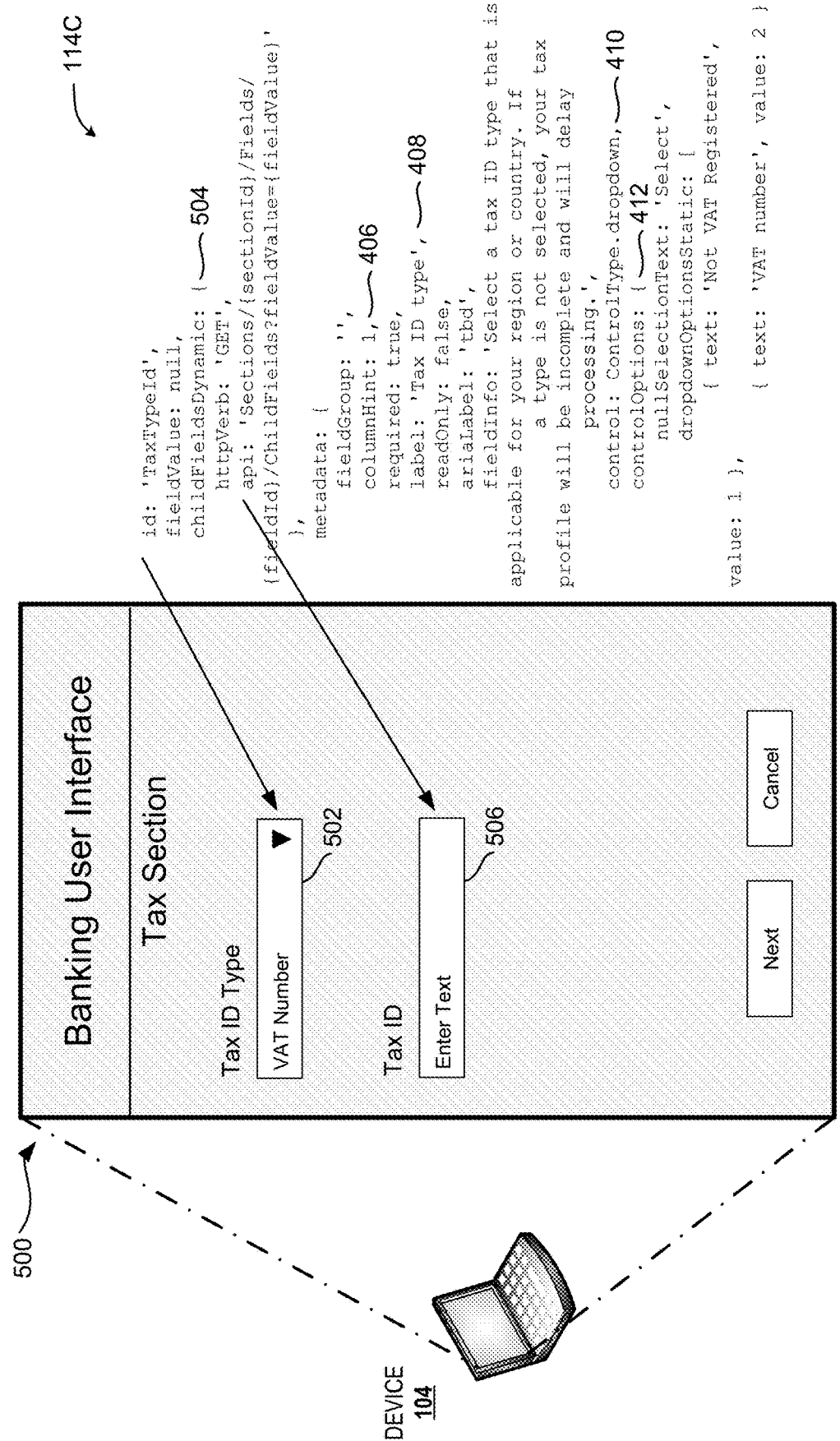
FIG. 6 illustrates an exemplary UI that may be displayed on a computing device in conjunction with the described metadata implemented UI techniques.

FIG. 6 illustrates the UI 500 subsequent to a user's selection of "VAT Number" from the drop-down field 502. Specifically, selection "VAT Number" from the drop-down field 502 triggers the API call 504. The API call 504 causes the server device 102 to deliver additional metadata that is used by the client computing device 104 and/or the application rendering the UI 500 to render an additional field 506 in the UI 500.

In some implementations, as illustrated, the additional field 506 is displayed concurrently with the drop-down field 502. Specifically, the additional field 506 is added to the UI 500. Furthermore, in some implementations, the UI 500 does not undergo a reload or refresh when the additional field 506 is added to the UI 500.

Figure 7:
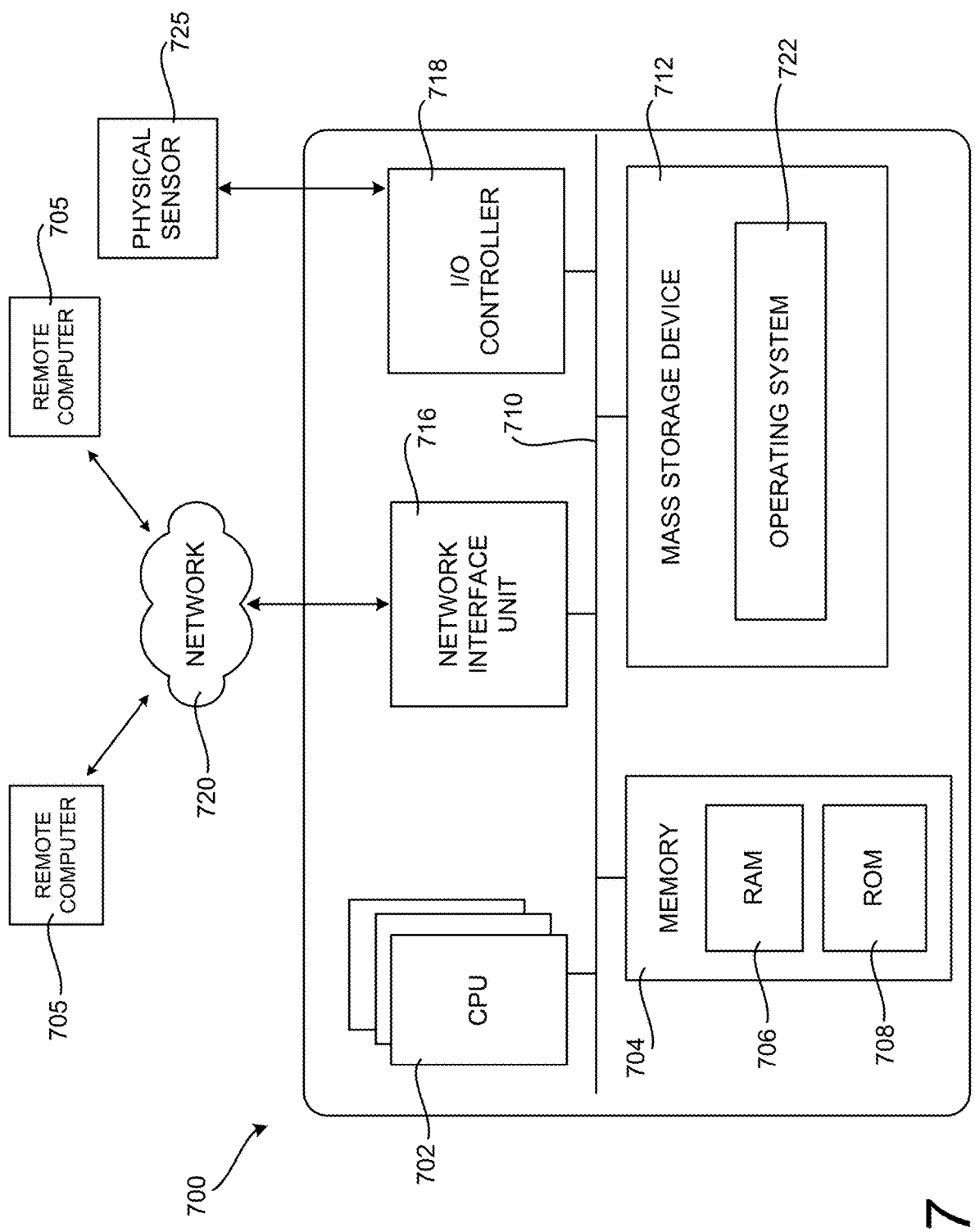
FIG. 7 is a computer architecture diagram showing an illustrative computer hardware and software architecture for a computing device that can implement aspects of the technologies presented herein.

FIG. 7 is a computer architecture diagram showing an illustrative computer hardware and software architecture for a computing device 700 that can implement the various technologies presented herein. In particular, the architecture illustrated in FIG. 7 can be utilized to implement a server computer, mobile phone, an e-reader, a smartphone, a desktop computer, an AR/VR device, a tablet computer, a laptop computer, or another type of computing device. In some implementations, the client computing devices 104 and the server device 102 implement some or all of the elements and functionalities associated with the computing device 700.

The computer 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system ("BIOS" or "firmware") containing the basic routines that help to transfer information between elements within the computer 700, such as during startup, can be stored in the ROM 708. The computer 700 further includes a mass storage device 712 for storing an operating system 722, application programs, and other types of programs. The mass storage device 712 can also be configured to store other types of programs and data.

The mass storage device 712 is connected to the CPU 702 through a mass storage controller (not shown) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers through a network such as the network 720. In some implementations, the network 106 provides at least some or all of the same functionalities as the network 720. The computer 700 can connect to the network 720 through a network interface unit 716 connected to the bus 710. It should be appreciated that the network interface unit 716 can also be utilized to connect to other types of networks and remote computer systems. The computer 700 can also include an input/output controller 718 for receiving and processing input from a number of other devices, including a keyboard, mouse, touch input, an electronic stylus (not shown in FIG. 7), or a physical sensor such as a video camera. Similarly, the input/output controller 718 can provide output to a display screen or other type of output device (also not shown in FIG. 7).

It should be appreciated that the software components described herein, when loaded into the CPU 702 and executed, can transform the CPU 702 and the overall computer 700 from a general-purpose computing device into a special-purpose computing device customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the architecture shown in FIG. 7 for the computer 700, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
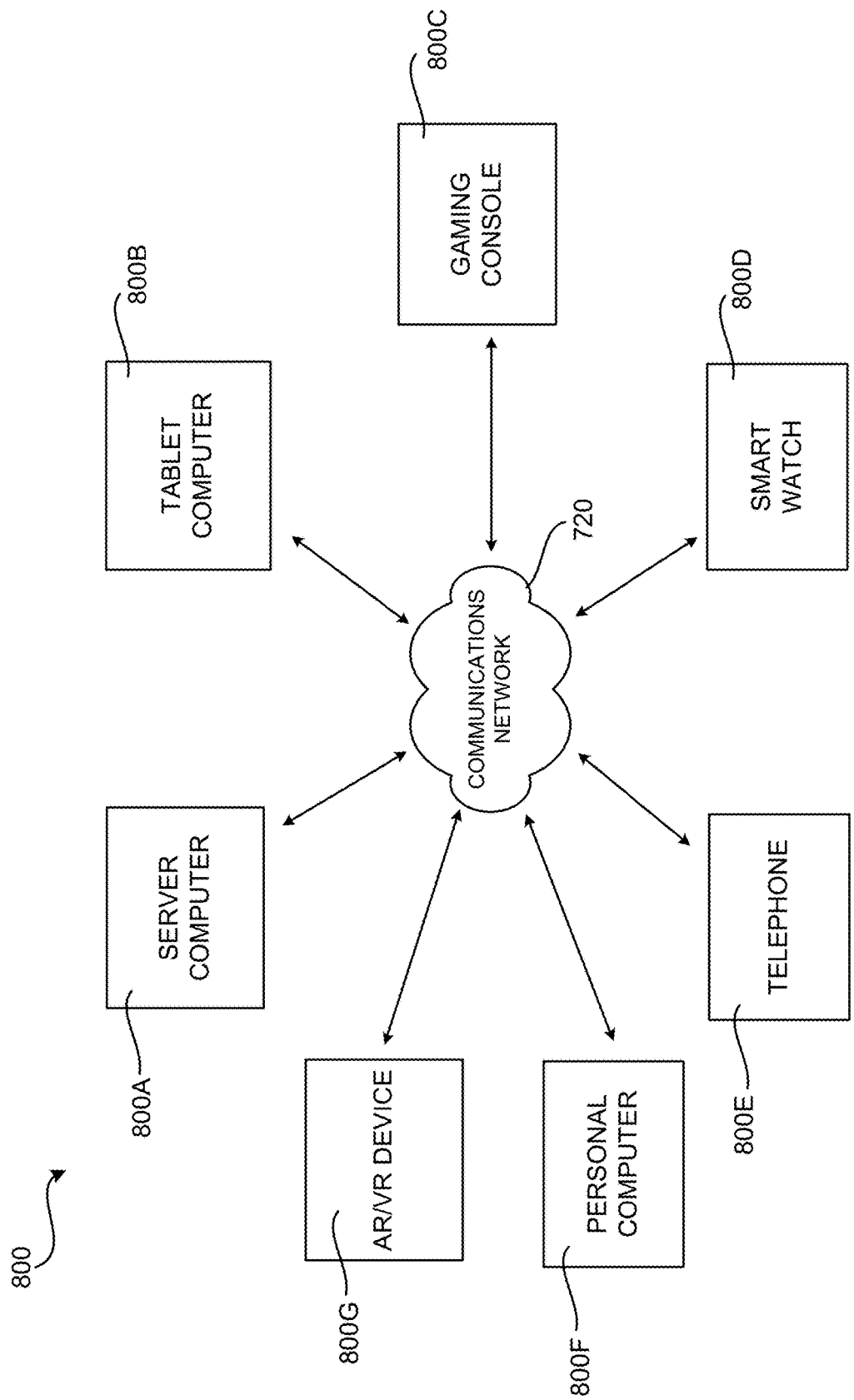
FIG. 8 is a network diagram illustrating a distributed computing environment in which aspects of the disclosed technologies can be implemented.

FIG. 8 is a network diagram illustrating a distributed network computing environment 800 in which aspects of the disclosed technologies can be implemented, according to various embodiments presented herein. The server device 102 may implement the distributed network computing environment 800 to provide distributed storage, via one or more distributed physical or virtual storages associated with one or more computing devices, for computing devices and the migration of files and data from the computing devices.

As shown in FIG. 8, one or more server computers 800A can be interconnected via a communications network 720 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 800B, a gaming console 800C, a smart watch 800D, a telephone 800E, such as a smartphone, a personal computer 800F, and an AR/VR device 800G.

In a network environment in which the communications network 720 is the Internet, for example, the server computer 800A can be a dedicated server computer operable to process and communicate data to and from the client computing devices 800B-800G via any of a number of known protocols, such as, hypertext transfer protocol ("HTTP"), file transfer protocol ("FTP"), or simple object access protocol ("SOAP"). Additionally, the networked computing environment 800 can utilize various data security protocols such as secured socket layer ("SSL") or pretty good privacy ("PGP"). Each of the client computing devices 800B-800G can be equipped with an operating system operable to support one or more computing applications or terminal sessions such as a web browser (not shown in FIG. 8), or other graphical user interface (not shown in FIG. 8), or a mobile desktop environment (not shown in FIG. 8) to gain access to the server computer 800A.

The server computer 800A can be communicatively coupled to other computing environments (not shown in FIG. 8) and receive data regarding a participating user's interactions/resource network. In an illustrative operation, a user (not shown in FIG. 8) may interact with a computing application running on a client computing device 800B-800G to obtain desired data and/or perform other computing applications.

The data and/or computing applications may be stored on the server 800A, or servers 800A, and communicated to cooperating users through the client computing devices 800B-800G over an exemplary communications network 720. A participating user (not shown in FIG. 8) may request access to specific data and applications housed in whole or in part on the server computer 800A. These data may be communicated between the client computing devices 800B-800G and the server computer 800A for processing and storage.

The server computer 800A can host computing applications, processes and applets for the generation, authentication, encryption, and communication of data and applications, and may cooperate with other server computing environments (not shown in FIG. 8), third party service providers (not shown in FIG. 8), network attached storage ("NAS") and storage area networks ("SAN") to realize application/data transactions.

It should be appreciated that the computing architecture shown in FIG. 7 and the distributed network computing environment shown in FIG. 8 have been simplified for ease of discussion. It should also be appreciated that the computing architecture and the distributed computing network can include and utilize many more computing components, devices, software programs, networking devices, and other components not specifically described herein.

Example Clauses

The disclosure presented herein encompasses the subject matter set forth in the following clauses.

Clause 1. A computer implemented method, comprising: calling, by a computing device via an application to cause display of a user interface (UI), an application service associated with a server device, the application service including one or more rules that include metadata that defines one or more UI features to be displayed by the UI; receiving, at the computing device, the metadata that defines the one or more UI features to be displayed by the UI, the metadata further including a reference to an application programming interface (API) call; causing, by the computing device, the application to render on a display associated with the computing device the UI that includes the one or more UI features defined by the metadata received by the computing device; detecting user interaction with the one or more UI features included in the UI; and in response to detecting the user interaction with the one or more UI features, causing, by the computing device, the application to initiate the API call referenced in the metadata.

Clause 2. The computer implemented method according to Clause 1, wherein initiating the API call referenced in the metadata causes the computing device to receive additional metadata that defines at least one or more additional UI features to be displayed by the UI.

Clause 3. The computer implemented method according to Clause 2, wherein the at least one or more additional UI features to be displayed by the UI is a child UI feature of the one or more UI features to be displayed by the UI.

Clause 4. The computer implemented method according to one or more of the Clauses 1-3, wherein the one or more UI features defined by the metadata comprise at least one or more fields to receive input data, label information for one or more fields, one or more layout instructions for one or more fields, or field rules that define permissible input to be received by one or more fields.

Clause 5. A computer implemented method, comprising: calling, by a computing device via an application to cause display of a user interface (UI), an application service associated with a server device, the application service including one or more rules that include metadata that defines one or more UI features to be displayed by the UI; receiving, at the computing device implementing the application to cause display of the UI, the metadata that defines the one or more UI features to be displayed by the UI; and causing, by the computing device, the application to render on a display associated with the computing device the UI that includes the one or more UI features defined by the metadata received by the client computing device.

Clause 6. The computer implemented method according to Clause 5, further comprising generating the one or more UI features using the metadata.

Clause 7. The computer implemented method according to one or more of the Clauses 5-6, wherein the one or more rules that include the metadata are modifiable via the server device to update the metadata or to provide additional metadata to thereby modify functionality associated with the one or more UI features, remove one or more UI features or add one or more UI features.

Clause 8. The computer implemented method according to one or more of the Clause 5-7, wherein the one or more UI features defined by the metadata comprise at least one or more fields to receive input data, label information for one or more fields, one or more layout instructions for one or more fields, or field rules that define permissible input to be received by one or more fields.

Clause 9. The computer implemented method according to one or more of the Clause 5-8, wherein the metadata comprises at least one application programming interface (API) call, the API call to execute upon user interaction with the one or more UI features defined by the metadata.

Clause 10. The computer implemented method according to Clause 9, further comprising: detecting, by the computing device via the application to cause display of the UI, user interaction with the one or more UI features; and executing the API call, in response to the user interaction, to generate at least one additional UI feature defined by metadata.

Clause 11. The computer implemented method according to Clause 10, wherein the at least one additional UI feature to be displayed by the UI is a child UI feature of the one or more UI features to be displayed by the UI.

Clause 12. A computing device, comprising: a processor; a computer-readable storage medium in communication with the processor, the computer-readable storage medium having computer-executable instructions stored thereupon which, when executed by the processor, cause the processor to: receive metadata that defines one or more user interface (UI) features to be displayed by a UI of an application associated with the computing device; and cause the application to render on a display associated with the computing device the UI that includes the one or more UI features defined by the metadata received by the client computing device.

Clause 13. The computing device according to Clause 12, wherein the computer-executable instructions, when executed by the processor, further cause the processor to: request the metadata that defines the one or more UI features to be displayed by the UI; and generate the one or more UI features using the metadata.

Clause 14. The computing device according to one or more of the Clauses 12-13, wherein the computer-executable instructions, when executed by the processor, further cause the processor to call an application service associated with a server device, the application service including one or more rules that include the metadata that defines the one or more UI features to be displayed by the UI.

Clause 15. The computing device according to Clause 14, wherein the one or more rules that include the metadata are modifiable via the server device to update the metadata or to provide additional metadata to thereby modify functionality associated with the one or more UI features, remove one or more UI features, or add one or more UI features.

Clause 16. The computing device according to one or more of the Clauses 12-15, wherein the one or more UI features defined by the metadata comprise at least one or more fields to receive input data, label information for one or more fields, one or more layout instructions for one or more fields, or field rules that define permissible input to be received by one or more fields.

Clause 17. The computing device according to one or more of the Clauses 12-16, wherein the metadata comprises at least one application programming interface (API) call, the API call to execute upon user interaction with the one or more UI features defined by the metadata.

Clause 18 The computing device according to Clause 17, wherein the computer-executable instructions, when executed by the processor, further cause the processor to: generate the one or more UI features using the metadata; detect user interaction with the one or more UI features; and execute the API call in response to the user interaction to generate at least one additional UI feature defined by metadata.

Clause 19. The computing device according to one or more of the Clauses 12-18, wherein the metadata defines at least a first UI feature and a second UI feature, the application to render on the display the second UI feature subsequent to rendering the first UI feature on the display.

Clause 20. The computing device according to Clause 19, wherein the computer-executable instructions, when executed by the processor, further cause the processor to: detect user interaction with the first UI feature on the display; and render the second UI feature on the display in response to detecting the user interaction with the first UI feature.

Clause 21. A computing device, comprising: a processor; a computer-readable storage medium in communication with the processor, the computer-readable storage medium having computer-executable instructions stored thereupon which, when executed by the processor, cause the processor to: call an application service associated with a server device, the application service including metadata that defines one or more user interface (UI) features to be displayed by a UI; receive the metadata that defines the one or more UI features to be displayed by the UI; render, on a display associated with the computing device, the UI that includes the one or more UI features defined by the metadata; detecting user interaction with the one or more UI features included in the UI; in response to detecting the user interaction with the one or more UI features, request additional metadata; receive the additional metadata, the additional metadata defining at least one additional UI feature; and concurrently display the at least one additional UI feature in the UI with the one or more UI features defined by the metadata.

Clause 22. The computing device according to Clause 21, wherein the computer-executable instructions, when executed by the processor, further cause the processor to: request the metadata that defines the one or more UI features to be displayed by the UI; and generate the one or more UI features using the metadata.

Clause 23. The computing device according to one or more of the Clauses 21-22, wherein the metadata that defines the one or more UI features to be displayed by the UI is received by a Web browser, the Web browser to provide the UI.

Clause 24. The computing device according to one or more of the Clauses 21-23, wherein the metadata is modifiable via the server device to update the metadata or to provide additional metadata to thereby modify functionality associated with the one or more UI features, remove one or more UI features, or add one or more UI features.

Clause 25. The computing device according to one or more of the Clauses 21-24, wherein the one or more UI features defined by the metadata comprise at least one or more fields to receive input data, label information for one or more fields, one or more layout instructions for one or more fields, or field rules that define permissible input to be received by one or more fields.

Clause 26. The computing device according to one or more of the Clauses 21-25, wherein the metadata comprises at least one application programming interface (API) call, the API call to execute upon the user interaction with the one or more UI features defined by the metadata.

Clause 27. The computing device according to one or more of the Clauses 21-26, wherein the computer-executable instructions, when executed by the processor, further cause the processor to execute the API call in response to the user interaction to generate at least one additional UI feature defined by metadata.

Clause 28. The computing device according to one or more of the Clauses 21-27, wherein the at least one additional UI feature displayed by the UI is a child UI feature of the one or more UI features displayed by the UI.

Clause 29. The computing device according to Clause 28, wherein the computer-executable instructions, when executed by the processor, further cause the processor to render, on the display associated with the computing device, the UI that includes a plurality of UI features from the one or more UI features defined by the metadata, at least some of the plurality of UI features rendered in unique sections of the UI.

Clause 30. A computer implemented method, comprising: calling, by a computing device via an application to cause display of a user interface (UI), an application service associated with a server device, the application service including metadata that defines one or more UI features to be displayed by the UI; receiving, at the computing device, the metadata that defines the one or more UI features to be displayed by the UI, the metadata further including a reference to an application programming interface (API) call; causing, by the computing device, the application to render, on a display associated with the computing device, the UI that includes the one or more UI features defined by the metadata; detecting user interaction with the one or more UI features included in the UI; in response to detecting the user interaction with the one or more UI features, causing, by the computing device, the application to initiate the API call referenced in the metadata; receiving, by the computing device, additional metadata in response to the API call, the additional metadata defining at least one additional UI feature, the additional metadata received from the server device; and adding, by the computing device, the at least one additional UI feature to the UI that includes the one or more UI features defined by the metadata, wherein the at least one additional UI feature is displayed concurrently in the UI with the one or more UI features.

Clause 31. The computer implemented method according to Clause 30, wherein the at least one additional UI feature displayed by the UI is a child UI feature of the one or more UI features displayed by the UI.

Clause 32. The computer implemented method according to at least one Clauses 30-31, wherein the one or more UI features defined by the metadata comprise at least one or more fields to receive input data, label information for one or more fields, one or more layout instructions for one or more fields, or field rules that define permissible input to be received by one or more fields.

Clause 33. The computer implemented method according to at least one of Clauses 30-32, wherein the application is a Web browser and the UI is associated with the Web browser.

Clause 34. A computer implemented method, comprising: calling, by a computing device via an application to cause display of a user interface (UI), an application service associated with a server device, the application service including metadata that defines one or more UI features to be displayed by the UI; receiving, at the computing device, the metadata that defines the one or more UI features to be displayed by the UI; causing, by the computing device, the application to render, on a display associated with the computing device, the UI that includes the one or more UI features defined by the metadata; detecting user interaction with the one or more UI features included in the UI; in response to detecting the user interaction with the one or more UI features, causing, by the computing device, the application request additional metadata; receiving, by the computing device, the additional metadata, the additional metadata defining at least one additional UI feature; and adding, by the computing device, the at least one additional UI feature to the UI that includes the one or more UI features defined by the metadata.

Clause 35. The computer implemented method according to Clause 34, further comprising generating the one or more UI features using the metadata, the generating performed by the application.

Clause 36. The computer implemented method according to at least one of Clauses 34-35, wherein the metadata is modifiable via the server device to update the metadata or to provide additional metadata to thereby modify functionality associated with the one or more UI features, remove one or more UI features or add one or more UI features.

Clause 37. The computer implemented method according to at least one of Clauses 34-36, wherein the one or more UI features defined by the metadata comprise at least one or more fields to receive input data, label information for one or more fields, one or more layout instructions for one or more fields, or field rules that define permissible input to be received by one or more fields.

Clause 38. The computer implemented method according to at least one of Clauses 34-37, wherein the metadata comprises at least one application programming interface (API) call, the API call to execute upon user interaction with the one or more UI features defined by the metadata, execution of the API call to request the additional metadata.

Clause 39. The computer implemented method according to Clause 38, further comprising: detecting, by the computing device via the application to cause display of the UI, user interaction with the one or more UI features; and executing the API call, in response to the user interaction, to generate at least one additional UI feature defined by metadata.

Clause 40. The computer implemented method according to Clause 39, wherein the at least one additional UI feature to be displayed by the UI is a child UI feature of the one or more UI features to be displayed by the UI.

Clause 41. A computing device, comprising: a processor; a computer-readable storage medium in communication with the processor, the computer-readable storage medium having computer-executable instructions stored thereupon which, when executed by the processor, cause the processor to: communicate from the computing device to a remote computing device metadata that defines one or more user interface (UI) features; receive notification that user interaction with the one or more UI features as occurred; provide additional metadata defining at least one additional UI, the additional metadata provided in response to receiving the notification that the user interaction with the one or more UI features as occurred; communicate, from the computing device to the remote computing device, the additional metadata defining the at least one additional UI feature, the additional metadata configured to add the at least one additional UI feature to a UI that includes the one or more UI features defined by the metadata, wherein the at least one additional UI feature is to be displayed concurrently in the UI with the one or more UI features.

Clause 42. The computing device according to Clause 41, wherein the computer-executable instructions, when executed by the processor, further cause the processor to receive a request for the metadata that defines the one or more UI features to be displayed by the UI.

Clause 43. The computing device according to at least one of Clauses 41-42, wherein the metadata that defines the one or more UI features to be displayed by the UI is to be received by a Web browser, the Web browser to provide the UI.

Clause 44. The computing device according to at least one of Clauses 41-43, wherein the metadata is modifiable via the remote device to update the metadata or to other additional metadata to thereby modify functionality associated with the one or more UI features, remove one or more UI features, or add one or more UI features.

Clause 45. The computing device according to at least one of Clauses 41-44, wherein the one or more UI features defined by the metadata comprise at least one or more fields to receive input data, label information for one or more fields, one or more layout instructions for one or more fields, or field rules that define permissible input to be received by one or more fields.

Clause 46. The computing device according to at least one of Clauses 41-45, wherein the metadata comprises at least one application programming interface (API) call, the API call to execute upon the user interaction with the one or more UI features defined by the metadata.

Clause 47. The computing device according to Clause 46, wherein the computer-executable instructions, when executed by the processor, further cause the processor to receive the API call in response to the user interaction to generate at least one additional UI feature defined by metadata.

Clause 48. The computing device according to at least one of Clauses 41-47, wherein the at least one additional UI feature to be displayed by the UI is a child UI feature of the one or more UI features displayed by the UI.

Clause 49. The computing device according to Clause 48, wherein the metadata defines at least a plurality of UI features, at least some of the plurality of UI features to be rendered in unique sections of the UI.

Although the techniques have been described in language specific to structural features and/or methodological acts, it is to be understood that the appended claims are not necessarily limited to the features or acts described. Rather, the features and acts are described as example implementations of such techniques.

The implementations described herein address the technical need to improve code implementations on client computing devices and the development of such code. The implementations described herein at least reduce the need to store and execute complex code designed for an entity's specific business need. In some instances, abundant local storage available to a computing device enhances performance of a processor and the physical storage associated with the computing device.

To address at least this technical need, the implementations described herein provide UI generation based on metadata stored at a central location, such as a server device. The metadata may be retrieve a client device and interpreted to generate a UI that is tailored to an entity's particular need (e.g., business need).

At least one benefit of the described metadata derived UIs is the reduction of unnecessary processor overhead and storage associated with a computing device that implements client code that is designed for a particular entity, such as a business entity that requires code that performs to suit the entity's business or field of business. The elimination of unnecessary processor overhead reduces battery drain and eliminates unnecessary memory use associated with computing devices.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:
1. A computer implemented method, comprising:
calling, by a computing device via an application to cause display of a user interface (UI), an application service associated with a server device, the application service including metadata that defines one or more UI features to be displayed by the UI;
receiving, at the computing device, the metadata that defines the one or more UI features to be displayed by the UI, the metadata further including a reference to an application programming interface (API) call;

causing, by the computing device, the application to render, on a display associated with the computing device, the UI that includes the one or more UI features defined by the metadata;

detecting user interaction with the one or more UI features included in the UI;

in response to detecting the user interaction with the one or more UI features, causing, by the computing device, the application to initiate the API call referenced in the metadata;

receiving, by the computing device, additional metadata in response to the API call, the additional metadata defining at least one additional UI feature, the additional metadata received from the server device; and adding, by the computing device, the at least one additional UI feature to the UI that includes the one or more UI features defined by the metadata, wherein the at least one additional UI feature is displayed concurrently in the UI with the one or more UI features.

2. The computer implemented method according to claim 1, wherein the at least one additional UI feature displayed by the UI is a child UI feature of the one or more UI features displayed by the UI.

3. The computer implemented method according to claim 1, wherein the one or more UI features defined by the metadata comprise at least one or more fields to receive input data, label information for one or more fields, one or more layout instructions for one or more fields, or field rules that define permissible input to be received by one or more fields.

4. The computer implemented method according to claim 1, wherein the application is a Web browser and the UI is associated with the Web browser.

5. A computer implemented method, comprising:
calling, by a computing device via an application to cause display of a user interface (UI), an application service associated with a server device, the application service including metadata that defines one or more UI features to be displayed by the UI;

receiving, at the computing device, the metadata that defines the one or more UI features to be displayed by the UI;

causing, by the computing device, the application to render, on a display associated with the computing device, the UI that includes the one or more UI features defined by the metadata;

detecting user interaction with the one or more UI features included in the UI;

in response to detecting the user interaction with the one or more UI features, causing, by the computing device, the application request additional metadata;

receiving, by the computing device, the additional metadata, the additional metadata defining at least one additional UI feature; and adding, by the computing device, the at least one additional UI feature to the UI that includes the one or more UI features defined by the metadata.

6. The computer implemented method according to claim 5, further comprising generating the one or more UI features using the metadata, the generating performed by the application.

7. The computer implemented method according to claim 5, wherein the metadata is modifiable via the server device to update the metadata or to provide additional metadata to thereby modify functionality associated with the one or more UI features, remove one or more UI features or add one or more UI features.

8. The computer implemented method according to claim 5, wherein the one or more UI features defined by the metadata comprise at least one or more fields to receive input data, label information for one or more fields, one or more layout instructions for one or more fields, or field rules that define permissible input to be received by one or more fields.

9. The computer implemented method according to claim 5, wherein the metadata comprises at least one application programming interface (API) call, the API call to execute upon user interaction with the one or more UI features defined by the metadata, execution of the API call to request the additional metadata.

10. The computer implemented method according to claim 9, further comprising:
detecting, by the computing device via the application to cause display of the UI, user interaction with the one or more UI features; and executing the API call, in response to the user interaction, to generate at least one additional UI feature defined by metadata.

11. The computer implemented method according to claim 10, wherein the at least one additional UI feature to be displayed by the UI is a child UI feature of the one or more UI features to be displayed by the UI.

12. A computing device, comprising:
a processor;
a computer-readable storage medium in communication with the processor, the computer-readable storage medium having computer-executable instructions stored thereupon which, when executed by the processor, cause the processor to:
communicate from the computing device to a remote computing device metadata that defines one or more user interface (UI) features;

receive notification that user interaction with the one or more UI features as occurred;

provide additional metadata defining at least one additional UI, the additional metadata provided in response to receiving the notification that the user interaction with the one or more UI features as occurred;

communicate, from the computing device to the remote computing device, the additional metadata defining the at least one additional UI feature, the additional metadata configured to add the at least one additional UI feature to a UI that includes the one or more UI features defined by the metadata, wherein the at least one additional UI feature is to be displayed concurrently in the UI with the one or more UI features.

13. The computing device according to claim 12, wherein the computer-executable instructions, when executed by the processor, further cause the processor to receive a request for the metadata that defines the one or more UI features to be displayed by the UI.

14. The computing device according to claim 12, wherein the metadata that defines the one or more UI features to be displayed by the UI is to be received by a Web browser, the Web browser to provide the UI.

15. The computing device according to claim 12, wherein the metadata is modifiable via the remote device to update the metadata or to other additional metadata to thereby modify functionality associated with the one or more UI features, remove one or more UI features, or add one or more UI features.

16. The computing device according to claim 12, wherein the one or more UI features defined by the metadata comprise at least one or more fields to receive input data, label information for one or more fields, one or more layout instructions for one or more fields, or field rules that define permissible input to be received by one or more fields.

17. The computing device according to claim 12, wherein the metadata comprises at least one application programming interface (API) call, the API call to execute upon the user interaction with the one or more UI features defined by the metadata.

18. The computing device according to claim 17, wherein the computer-executable instructions, when executed by the processor, further cause the processor to receive the API call in response to the user interaction to generate at least one additional UI feature defined by metadata.

19. The computing device according to claim 12, wherein the at least one additional UI feature to be displayed by the UI is a child UI feature of the one or more UI features displayed by the UI.

20. The computing device according to claim 19, wherein the metadata defines at least a plurality of UI features, at least some of the plurality of UI features to be rendered in unique sections of the UI.

\* \* \* \* \*